_(12)_ United States Patent
Hagiwara et al.

(10) Patent No.: US 7,787,475 B2
(45) Date of Patent: Aug. 31, 2010

(54) APPARATUS FOR PROCESSING A RECEIVED SIGNAL IN A COMMUNICATION NETWORK

(75) Inventors: Shu Hagiwara, Taito-ku (JP); Suguru Nishio, Fukuroi (JP); Shingo Tsunoda, Kawasaki (JP); Yasuhiro Konishi, Kohfu (JP); Masateru Gohno, Taito-ku (JP)

(73) Assignee: Next Magic Incorporated (JP)

( * ) Notice: Subject to any disclaimer, the term of this patent is extended or adjusted under 35 U.S.C. 154(b) by 12 days.

(21) Appl. No.: 11/885,942

(22) PCT Filed: Mar. 20, 2006

(86) PCT No.: PCT/JP2006/305543

§ 371 (c)(1),
(2), (4) Date: May 12, 2008

(87) PCT Pub. No.: WO2006/103975

PCT Pub. Date: Oct. 5, 2006

(65) Prior Publication Data

US 2008/0273542 A1    Nov. 6, 2008

(30) Foreign Application Priority Data

Mar. 28, 2005    (JP) .............................. 2005-090615

(51) Int. Cl.
*H04L 12/56* (2006.01)
(52) U.S. Cl. ..................... 370/400; 370/474; 370/392
(58) Field of Classification Search .................. 370/400, 370/474, 394, 466, 401

See application file for complete search history.

(56) References Cited

U.S. PATENT DOCUMENTS

| 6,490,296 | B2 * | 12/2002 | Shenoi et al. ............... 370/469 |
| 6,754,217 | B1 * | 6/2004 | Ahn ........................ 370/395.6 |
| 6,804,698 | B1 * | 10/2004 | Richards et al. ............. 718/104 |
| 6,829,240 | B1 * | 12/2004 | Lincoln et al. ........... 370/395.1 |
| 6,829,248 | B1 * | 12/2004 | Metzger et al. ............. 370/466 |
| 7,508,758 | B1 * | 3/2009 | Kekki ........................ 370/230 |

FOREIGN PATENT DOCUMENTS

JP    2004-032739    1/2004

OTHER PUBLICATIONS

International Search Report for PCT/JP2006/305543 Dated Jun. 6, 2006.
Written Opinion of the International Searching Authority Application No. PCT/JP2006/305543.

* cited by examiner

*Primary Examiner*—Ricky Ngo
*Assistant Examiner*—Rasheed Gidado
(74) *Attorney, Agent, or Firm*—Studebaker & Brackett PC; Donald R. Studebaker

(57) ABSTRACT

A communication apparatus having a temporary managing portion for controlling a temporary memory, a main managing portion for controlling a main memory and an operation control portion. The operation control portion causes the temporary managing portion and the main managing portion to utilize the state information or the history and state information for obtaining probability of deletion or transmission and probability of delay with regard to each data frame of framed data for discharge and to control, on the basis of the obtained probability of deletion or transmission and the obtained probability of delay, deletion or transmission of the data frame of the framed data for discharge and delay for transmission of the data frame of the framed data for discharge on the occasion of the transmission thereof.

5 Claims, 5 Drawing Sheets

APPARATUS FOR PROCESSING A RECEIVED SIGNAL IN A COMMUNICATION NETWORK

TECHNICAL FIELD

The present invention relates to a communication apparatus which can be applied, for example, to constitute a relay node provided for relaying an information signal as the subject of communication in a communication network wherein mutual communication between two communication terminals or among a plurality of communication terminals is performed.

TECHNICAL BACKGROUND

Mutual information signal communication between two communication terminals, such as portable telephones, personal computers or the like, is usually carried out through a predetermined communication network in the form of wireless system or wire system. There has been proposed a relatively new style of the communication network by the name of mesh network.

The mesh network is different from known communication networks each constituted with a base node which functions as a central controller and a plurality of relay nodes, each of which operates under the control by the base node. In the mesh network, any node corresponding to the base node functioning as the central controller is not provided but a plurality of relay nodes are provided in such a manner that each contiguous two of the relay nodes are placed with their communication areas overlapping partially with each other so that communication paths extend in a reticulated pattern. With the mesh network, the following advantages can be obtained. For example, when a certain one of the relay nodes provided in the mesh network is put in an obstructive condition for interrupting communication temporarily, the communication is rapidly revived through another relay node provided in the mesh network. In addition, it is easy to add a new relay node to the network.

The mesh network constituted with a plurality of relay nodes wherein communication between a communication terminal and the relay node or between the relay nodes is carried out by means of wireless is named a so called wireless mesh network. One of serious problems arising in the wireless mesh network is a trouble brought about by electric wave collision. In such a trouble, electric waves transmitted respectively from a plurality of transmission sources come into collision with each other on a certain communication channel so as to obstruct propagation of the electric waves and therefore the communication through the same communication channel cannot be appropriately performed.

Accordingly, various methods or measures have been proposed for avoiding the electric wave collision arising on the communication channel as described above. One of such methods or measures is, for example, the CSMA/CA (Carrier Sense Multiple Access with Collision Avoidance) system (as disclosed in, for example, non patent document 1). In the CSMA/CA system, when an information signal is intended to be transmitted, first, the condition of occupation on the communication channel selected to transmit the information signal is detected. (The detection carried out in such a manner is called "carrier sense".) Then, if it is clarified that the communication channel is in an idle state wherein the communication channel is not used for communication, as a result of the carrier sense, the information signal transmission is commenced when the idle state continues for a predetermined period of time. On the other hand, if it is clarified that the communication channel is in a busy state wherein the communication channel is used for communication, as a result of the carrier sense, the commencement of the information signal transmission is delayed until the communication channel comes to the idle state. Consequently, the electric wave collision on the communication channel selected to transmit the information signal is restricted.

Another of the methods or measures proposed for avoiding the electric wave collision arising on the communication channel is, for example, the RTS-CTS (Request To Send-Clear To Send) system (as disclosed in, for example, non patent document 2). In the RTS-CTS system, when an information signal is intended to be transmitted, first, the relay node in the transmission side is operative to transmit RTS information which represents the intention of the information signal transmission. The relay node in the reception side which has correctly received the RTS information is operative to transmit CTS information which represents the completion in preparations for receiving the information signal. Then, the relay node in the transmission side which has correctly received the CTS information is further operative to commence the information signal transmission. Consequently, the electric wave collision on a communication channel selected to transmit the information signal is restricted. There is also proposed the MARCH (Media Access with Reduced Handshake) system in which interception of wireless signals is utilized so that only a transmission source is required to transmit the RTS information and each of the relay nodes is not required to transmit the RTS information but required to transmit the CTS information, as a kind of the RTS-CTS system different from the standard RTS-CTS system in which each of the relay nodes is operative to transmit and receive the RTS information and the CTS information. With the MARCH system, when the information signal is sequentially relayed by a plurality of relay nodes, the number of operations for transmitting and receiving the RTS information and the CTS information carried out in each of the relay node, each of which is called "handshake", can be reduced.

The non patent document 1: Syozoh Komaki, et al., "Wireless Technology and Applications Thereof 3: Wireless LAN and Ubiquitous Network", Maruzen Kabushikigaisha, pp. 109 to 118, 30 Jan. 2004

The non patent document 2: C-K. Toh, "Ad Hoc Mobile Wireless Networks", First Edition, Kozo Keikaku Engineering Inc., pp. 44 to 53, 31 May 2003

DISCLOSURE OF THE INVENTION

Problems Intended to be Solved by the Invention

When the CSMA/CA system as described above is adopted as the method for avoiding electric wave collision arising on a communication channel in the wireless mesh network constituted with a plurality of relay nodes, it is indispensable prior to information signal transmission to carry out the carrier sense, by which the condition of occupation on the communication channel selected to transmit the information signal is detected. The carrier sense is carried out in each of the relay nodes in such a manner that the power level of a signal received through the communication channel is detected to be compared with a predetermined reference level and it is judged that the communication channel is in an idle state when the detected power level is smaller than the predetermined reference level or it is judged that the communication channel is in a busy state when the detected power level is equal to or larger than the predetermined reference level.

Since it is troublesome or annoying for each of the relay nodes to carry out the carrier sense as mentioned above at every information signal transmission, it is desired that the carrier sense is unnecessary for each of the relay nodes, if it is possible.

When the MARCH system as described above is adopted as the method for avoiding electric wave collision arising on a communication channel in the wireless mesh network constituted with a plurality of relay nodes, each of the relay nodes is operative to transmit and receive the RTS information and the CTS information or to transmit and receive the CTS information prior to information signal transmission. This means that operations for transmitting and receiving control information are carried out in preparations for the signal information transmission which is to be essentially carried out in each of the relay nodes and thereby total communication traffic is increased. Especially, in a large-scale wireless mesh network, it is feared that the increase in total communication traffic brought about by the operations for transmitting and receiving control information carried out in preparations for the signal information transmission induces undesirable convergence of the communication traffic which forms a bottleneck in the wireless mesh network and the bottleneck thus formed exerts a bad influence upon the whole wireless mesh network so that, in the worst case, the whole wireless mesh network ceases to function correctly.

Since the wireless mesh network is practically constituted with the relay nodes, in the last analysis, the above mentioned problems brought about in the wireless mesh network results from the function which each of the relay nodes constituting the wireless mesh network has to be fulfilled.

Accordingly, it is an object of the present invention to provide a communication apparatus which can be applied to constitute each of relay nodes provided for constituting a novel wireless communication network, with which advantages exceeding the advantages obtained with the known wireless mesh network are obtained, and which avoids surely and effectively electric wave collision arising on a communication channel selected to transmit a communication signal in the wireless communication network without carrying out a so-called carrier sense accompanying with the CSMA/CA system or carrying out operations for transmitting and receiving control information, such as operations for transmitting and receiving the RTS information and the CTS information or operations for transmitting and receiving the CTS information accompanying with the MARCH system.

Approach to Solve the Problems

According to the invention claimed in any one of claims 1 to 5 of this application, there is provided a communication apparatus comprising a signal receiving and transmitting portion operative to receive an input communication signal for obtaining an input information signal and to transmit an output communication signal based on an output information signal; a reassembling and segmenting portion operative to cause the input information signal to be subjected to reassembling process for obtaining first framed data which form a data frame containing a header segment wherein identification information is provided and an information segment wherein communication information is provided and to cause second framed data which form a data frame containing a header segment wherein processed identification information is provided and an information segment wherein communication information is provided to be subjected to segmenting process for obtaining the output information signal; temporary memory means for storing temporarily the first framed data obtained from the reassembling and segmenting portion and for storing temporarily the second framed data and then discharging the second framed data stored therein to the reassembling and segmenting portion; main memory means for storing therein the identification information contained in the first framed data stored in the temporary memory means, preserving the stored identification information as history information as occasion demands, discharging the stored identification information or the stored identification information having been subjected to modifying process to the temporary memory means as the processed identification information, and preserving state information representing an excessive reception state of the input communication signal, an excessive transmission state of the output communication signal or a balanced reception/transmission state of the input and output communication signals, which is recognized based on information representing the amount of input communication signal reception and the amount of output communication signal transmission obtained on the basis of the amount of first framed data storage at intervals of predetermined time and the amount of second framed data discharge at intervals of predetermined time and a result of comparison between the amount of input communication signal reception and the amount of output communication signal transmission; a temporary managing portion operative to control operations in the temporary memory means for storing temporarily therein the first and second framed data; a main managing portion operative to control operations in the main memory means for storing and preserving the identification information, discharging the processed identification information and preserving the state information; and an operation control portion for controlling operations of the signal receiving and transmitting portion, the reassembling and segmenting portion, the temporary memory means, the main memory means, the temporary managing portion and the main managing portion. The operation control portion is operative to cause the temporary managing portion and the main managing portion to utilize the state information or the history and state information for obtaining probability of deletion or transmission and probability of delay with regard to the data frame of the second framed data and to control, on the basis of the obtained probability of deletion or transmission and the obtained probability of delay, deletion or transmission of the data frame of the second framed data and delay for transmission of the data frame of the second framed data on the occasion of the transmission thereof.

Especially, in one embodiment of communication apparatus according to the invention claimed in claim 3 of this application, the temporary managing portion and the main managing portion are operative to utilize the probability of deletion or transmission and pseudo-random numbers for controlling the deletion or the transmission of the data frame of the second framed data.

In the communication apparatus according to the present invention thus constituted, the input information signal is obtained from the input communication signal in the signal receiving and transmitting portion. Then, the first framed data are produced based on the input information signal from the signal receiving and transmitting portion in the reassembling and segmenting portion to be stored in the temporary memory means. The identification information contained in the first framed data in the temporary memory means is read from the temporary memory means to be stored in the main memory means. The identification information stored in the main memory means is preserved as the history information in the main memory means and then subjected to the modifying process to be stored as the processed identification information in the temporary memory means or stored as the processed identification information in the temporary memory means without being subjected to the modifying process. The processed identification information stored in the temporary memory means is applied to form the second framed data to be contained in the same and the second framed data are discharged to the reassembling and segmenting portion, as occasion demands, so that the output information signal is produced on the basis of the communication information contained in the second framed data in the reassembling and segmenting portion and the output communication signal obtained from the output information signal is transmitted through the signal receiving and transmitting portion.

Under such a situation as mentioned above, the temporary managing portion and the main managing portion which are operative to control the temporary memory means and the main memory means, respectively, operate under the control by the operation control portion as follows. First, the temporary managing portion and the main managing portion determine the amount of input communication signal reception and the amount of output communication signal transmission on the basis of the amount of first framed data storage at intervals of predetermined time and the amount of second framed data discharge at intervals of predetermined time and then cause the state information representing the excessive reception state of the input communication signal, the excessive transmission state of the output communication signal or the balanced reception/transmission state of the input and output communication signals, which is recognized based on the information representing the amount of the input communication signal reception and the amount of the output communication signal transmission and the result of comparison between the amount of the input communication signal reception and the amount of the output communication signal transmission, to be preserved in the main memory means.

Further, the temporary managing portion and the main managing portion utilize the state information or the history and state information preserved in the main memory means for obtaining the probability of deletion or transmission with regard to the data frame of the second framed data and the probability of delay with regard to the data frame of the second framed data and then control, on the basis of the obtained probability of deletion or transmission and the obtained probability of delay, the deletion or transmission of the data frame of the second framed data and the delay for transmission of the data frame of the second framed data on the occasion of the transmission thereof. When the operation for transmitting of the data frame of the second framed data is carried out under the control by the operation control portion in such a manner as described above, the output communication signal which is formed based on the output information signal produced on the basis of the communication information contained in the second framed data is transmitted through the signal receiving and transmitting portion.

EFFECT AND ADVANTAGES OF THE INVENTION

In the communication apparatus according to the present invention, the state information or the history and state information is utilized for obtaining the probability of deletion or transmission and the probability of delay with regard to the date frame of the second framed data and the data frame of the second framed data is deleted or transmitted in accordance with the obtained probability of deletion or transmission and the obtained probability of delay so as to respond to the amount of the input communication signal reception and the amount of the output communication transmission. Consequently, the communication apparatus according to the present invention is operative to transmit the output communication signal through the signal receiving and transmitting portion in such a manner as to be able to avoid electric wave collision arising on a communication channel selected to transmit the output communication signal without carrying out a so-called carrier sense accompanying with the CSMA/CA system or carrying out operations for transmitting and receiving control information, such as operations for transmitting and receiving the RTS information and the CTS information or operations for transmitting and receiving the CTS information accompanying with the MARCH system.

Then, a communication network can be constituted with a plurality of communication apparatus according to the present invention which are dispersedly arranged for functioning as relay nodes in such a manner that a communication link is formed between each mutually contiguous two of the communication apparatus. In the communication network thus constituted with the communication apparatus according to the present invention, electric wave collision arising on each of communication channels provided for transmitting communication signals can be avoided surely and effectively.

Accordingly, the communication apparatus according to the present invention can be applied to constitute each of relay nodes provided for constituting a novel wireless communication network, with which advantages exceeding the advantages obtained with the known wireless mesh network are obtained, and which avoids surely and effectively electric wave collision arising on a communication channel selected to transmit a communication signal in the wireless communication network without carrying out, for example, the carrier sense accompanying with the CSMA/CA system or carrying out, for example, operations for transmitting and receiving the RTS information and the CTS information or operations for transmitting and receiving the CTS information accompanying with the MARCH system.

Figure 1:
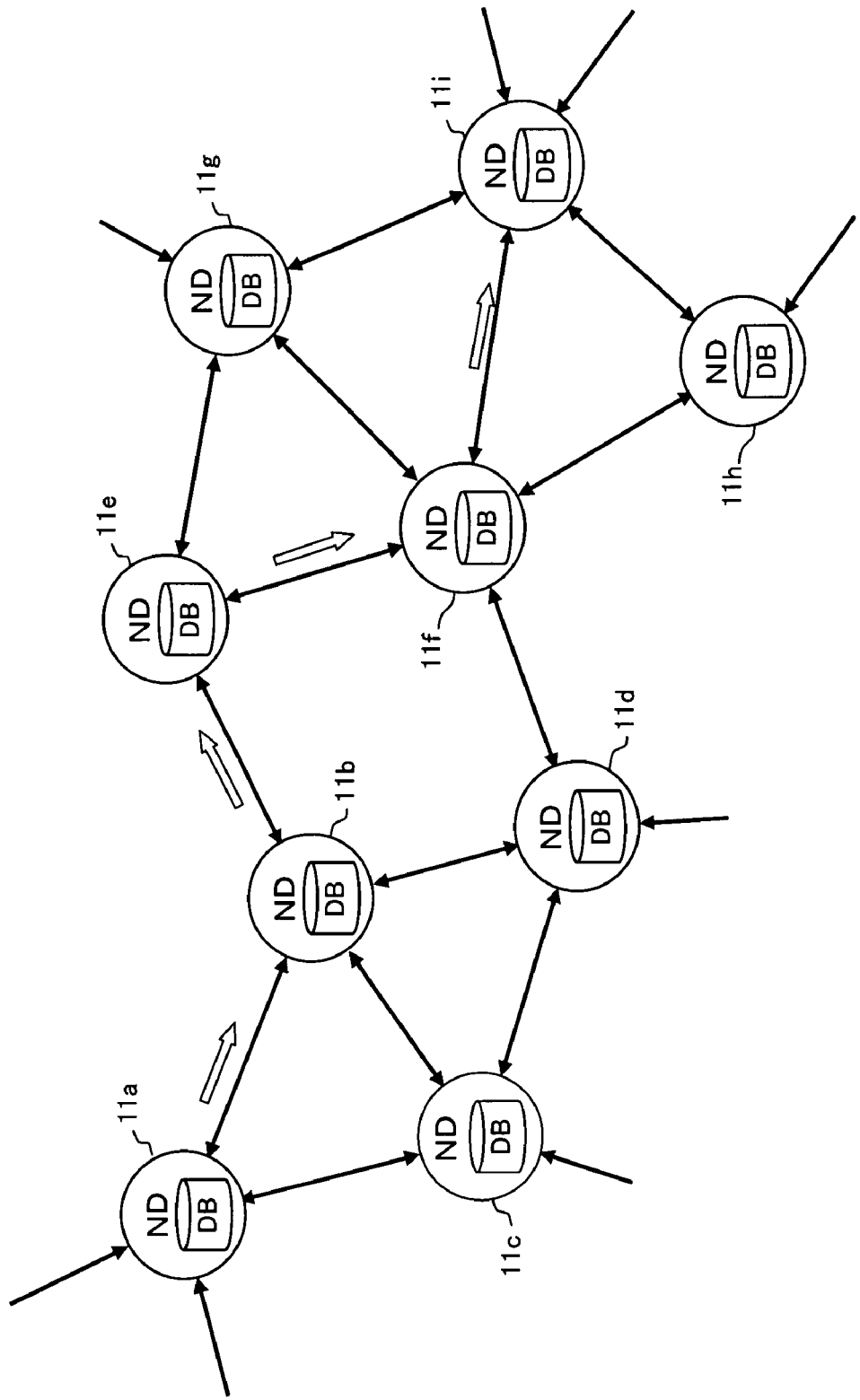
FIG. 1 is a schematic illustration showing an example of a communication network constituted with a plurality of relay nodes, each of which can be constituted with an embodiment of communication apparatus according to the present invention.

DESCRIPTION OF REFERENCES IN THE DRAWINGS $11a$~$11i$ . . . relay nodes, $12$, $13a$ to $13n$ . . . signal receiving and transmitting portions, $14$ . . . reassembling and segmenting portion, 15 . . . temporary memory means, 16 . . . temporary managing portion, 17 . . . main memory means, 18 . . . main managing portion, 20 . . . operation control portion

EMBODIMENT MOST PREFERABLE FOR WORKING OF THE INVENTION

An embodiment most preferable for the working of the present invention will be explained below, together with a communication network to which the embodiment can be applied.

FIG. 1 shows an example of a communication network constituted with a plurality of relay nodes, each of which is able to be constituted with a communication apparatus according to the present invention.

In the communication network shown in FIG. 1, a plurality of relay nodes 11a to 11i, each of which is labeled "ND", are dispersedly arranged in such a manner that each contiguous two of the relay nodes 11a to 11i are placed with their communication areas overlapping partially with each other. Two of the relay nodes 11a to 11i interconnected with a solid arrow in FIG. 1 are contiguous to each other and operative to communicate mutually. Each of the relay nodes 11a to 11i has a database DB which is constituted with memory means for storing history information, state information, and so on, related to a communication signal arriving thereat. (More details as to the history information, the state information, and so on, will be explained later.)

One or more communication terminals, such as portable telephones, personal computers or the like, are registered at each of the relay nodes 11a to 11i or some of the relay nodes 11a to 11i to be under the control of the same. Each of the communication terminals is discriminated with identification information of its own.

When it is intended to communicate, for example, a communication signal having arrived at the relay node 11a to the relay node 11i from the relay node 11a, the communication signal destined for the relay node 11i is transmitted from the relay node 11a through a communication path passing in succession, for example, the relay nodes 11b, 11e and 11f to the relay node 11i. In each of the relay nodes 11a, 11b, 11e, 11f and 11i, various kinds of identification information contained in the communication signal arriving thereat are processed with reference to the history information, the state information, and so on, preserved in the database DB and then the arriving communication signal is relayed to another of the relay nodes 11a, 11b, 11e, 11f and 11i or the communication terminal.

Embodiment

Figure 2:
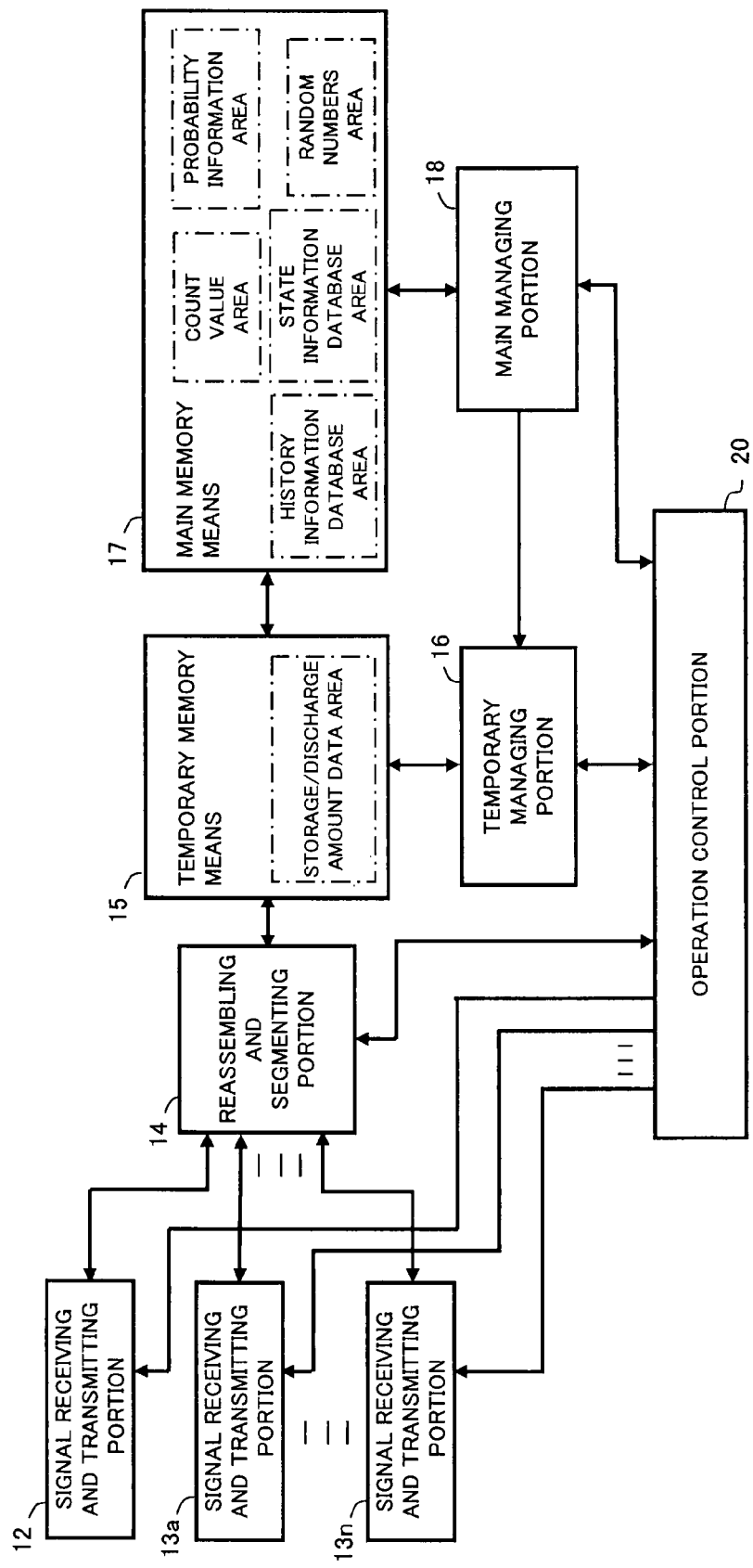
FIG. 2 is a schematic block diagram showing the embodiment of communication apparatus according to the present invention.

FIG. 2 shows an embodiment of communication apparatus according to the present invention, which can be applied to constitute each of the relay nodes 11a to 11i shown in FIG. 1.

The embodiment shown in FIG. 2, which constitutes a rely node, such as one of the relay nodes 11a to 11i, comprises a signal receiving and transmitting portion 12 for communication terminals and a plurality of signal receiving and transmitting portions 13a to 13n for relay nodes. The signal receiving and transmitting portion 12 is provided for communicating with communication terminals registered at the relay node constituted with the embodiment shown in FIG. 2 and operative to receive an input communication signal from one of the communication terminals and to transmit an output communication signal to the communication terminals. Each of the signal receiving and transmitting portions 13a to 13n is provided for communicating with additional relay nodes each contiguous to the relay node constituted with the embodiment shown in FIG. 2 and operative to receive an input communication signal from one of the additional relay nodes and to transmit an output communication signal to the rest of the additional relay nodes.

Each of the signal receiving and transmitting portions 12 and 13a to 13n, which receives the input communication signal, produces an input information signal based on the input communication signal received thereby and supplies a reassembling and segmenting portion 14 with the input information signal.

Figure 3:
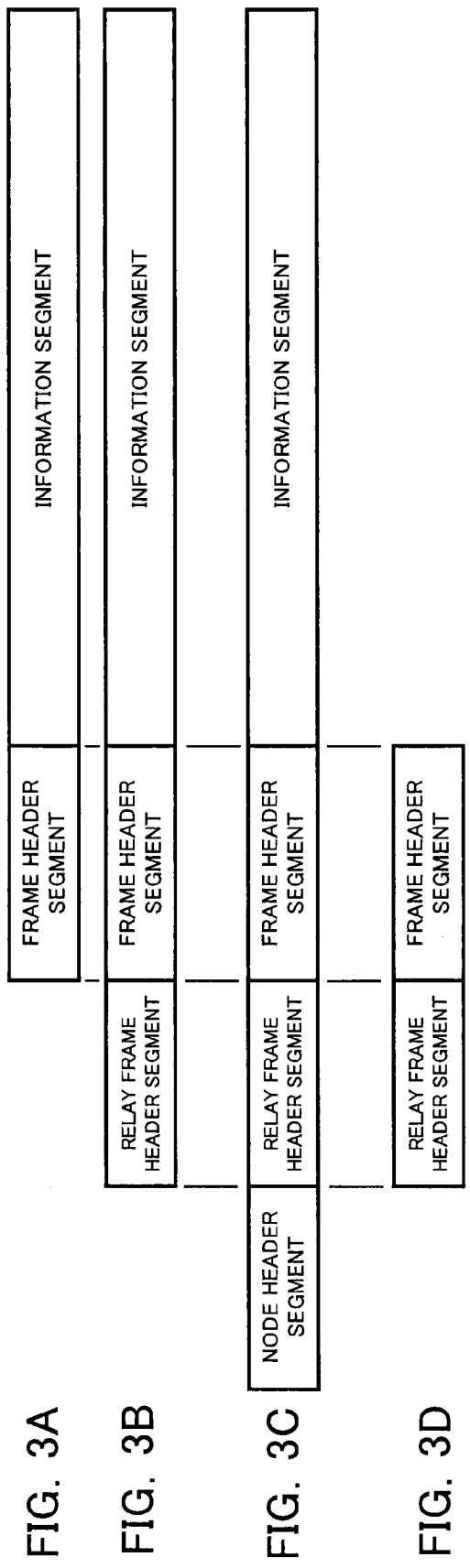
FIGS. 3A to 3D are schematic illustrations showing examples of data formats each representing an allocation of framed data or a part of the framed data obtained in the embodiment shown in FIG. 2.

When the input information signal is supplied to the reassembling and segmenting portion 14 from the signal receiving and transmitting portion 12, the reassembling and segmenting portion 14 is operative to cause the input information signal to be subjected to reassembling process so as to produce framed data for storage which form a data frame containing a frame header segment and an information segment successive to the frame header segment, as shown in FIG. 3A, on the basis of the input information signal from the signal receiving and transmitting portion 12. In the data frame shown in FIG. 3A, various kinds of identification information, such as identification information representing a transmission source of the input information signal supplied to the reassembling and segmenting portion 14, identification information representing a destination of the input information signal supplied to the reassembling and segmenting portion 14, and so on, are provided in the frame header segment, and communication information which is transferred by the input information signal supplied to the reassembling and segmenting portion 14 is provided in the information segment.

When the input information signal is supplied to the reassembling and segmenting portion 14 from one of the signal receiving and transmitting portions 13a to 13n, the reassembling and segmenting portion 14 is operative to cause the input information signal to be subjected to reassembling process so as to produce framed data for storage which form a data frame containing a relay frame header segment, a frame header segment successive to the relay frame header segment and an information segment successive to the frame header segment, as shown in FIG. 3B, on the basis of the input information signal from one of the signal receiving and transmitting portions 13a to 13n. In the data frame shown in FIG. 3B, identification information related to relay nodes, through each of which the input information signal supplied to the reassembling and segmenting portion 14 has passed, identification information representing a value which reduces at every transit of the input information signal through the relay node (hereinafter, referred to as a Budget), and so on, are provided in the relay frame header segment, then, various kinds of identification information, such as identification information representing a transmission source of the input information signal supplied to the reassembling and segmenting portion 14, identification information representing a destination of the input information signal supplied to the reassembling and segmenting portion 14, and so on, are provided in the frame header segment, and communication information which is transferred by the input information signal supplied to the reassembling and segmenting portion 14 is provided in the information segment.

The value represented by the Budget is, for example, 1,000 at the first relay node and reduces, for example, by 200 at every transit of the input communication signal through the second or subsequent relay node unless there is a particular condition.

Further, when the framed data for storage are so produced as to form the data frame containing the frame header segment and the information segment successive to the frame header segment, as shown in FIG. 3A, the reassembling and segmenting portion 14 is further operative to add a new relay frame header segment to the data frame containing the frame header segment and the information segment successive to the frame header segment so that the data frame containing the relay frame header segment, the frame header segment successive to the relay frame header segment and the information segment successive to the frame header segment, as shown in FIG. 3B, is formed. In the relay frame header segment, various kinds of identification information which include the Budget representing the value of, for example, 1,000 are provided. This means that the reassembling and segmenting portion 14 produces the framed data for storage which form the data frame containing the relay frame header segment, the frame header segment successive to the relay frame header segment and the information segment successive to the frame header segment, as shown in FIG. 3B, in either case wherein the input information signal is supplied to the reassembling and segmenting portion 14 from the signal receiving and transmitting portion 12 or the input information signal is supplied to the reassembling and segmenting portion 14 from one of the signal receiving and transmitting portions 13a to 13n. The framed data for storage thus produced by the reassembling and segmenting portion 14 are supplied to temporary memory means 15.

Each of the signal receiving and transmitting portion 12 for communication terminals, the signal receiving and transmitting portions 13a to 13n for relay nodes and the reassembling and segmenting portion 14 operates under the control by an operation control portion 20. The temporary memory means 15 stores therein the framed data for storage under the control by a temporary managing portion 16 which is provided exclusively for the temporary memory means 15. The temporary managing portion 16 operates under the control by the operation control portion 20.

The temporary managing portion 16 is operative to add a node header segment, which is used only in the relay node constituted with the embodiment shown in FIG. 2, to the data frame of the framed data for storage stored in the temporary memory means 15. Therefore, the framed data for storage stored in the temporary managing portion 16 form a data frame containing the node header segment, the relay frame header segment successive to the node header segment, the frame header segment successive to the relay frame header segment and information segment successive to the frame header segment, as shown in FIG. 3C. In the node header segment, identification information representing a processing situation of the framed data for storage, such as a situation wherein the framed data for storage have not been processed yet, a situation wherein the framed data for storage are in process or a situation wherein the framed data for storage have been processed, and various kinds of other identification information, such as time information of the process to which the framed data for storage are subjected, various kinds of graphic information, and so on, are provided.

The temporary managing portion 16 is operative to scan the identification information provided in each of the node header segment, the relay frame header segment and the frame header segment contained in the data frame of the framed data for storage stored in the temporary memory means 15 in order to determine whether the identification information in the node header segment represents a situation wherein transferred communication information has been renewed or not, whether the identification information in the relay frame header segment represents a situation wherein transferred communication information should be further transferred compulsorily or is able to be deleted or not, and whether the identification information in the frame header segment represents a situation wherein communication information destined for a communication terminal belonging to the relay node constituted with the embodiment shown in FIG. 2 exists or not, and so on. Then, for example, when the identification information in the relay frame header segment represents the situation wherein the transferred communication information should be further transferred compulsorily, the temporary managing portion 16 is operative to discharge the framed data for storage stored in the temporary memory means 15 to the reassembling and segmenting portion 14 as framed data for discharge to be applied for transmission. The reassembling and segmenting portion 14 is operative to cause the framed data for discharge from the temporary memory means 15 to be subjected to segmenting process for producing an output information signal based on the framed data for discharge and to supply one of the signal receiving and transmitting portions 13a to 13n with the output information signal. The selected one of the signal receiving and transmitting portions 13a to 13n to which the output information signal is supplied is operative to produce an output communication signal based on the output information signal and then transmit the output communication signal to other relay nodes each contiguous to the relay node constituted with the embodiment shown in FIG. 2. Thereby, the transmission of the framed data for discharge is carried out.

In such a case as mentioned above, each of the reassembling and segmenting portion 14 and the selected one of the signal receiving and transmitting portions 13a to 13n operates also under the control by the operation control portion 20.

Further, for example, when the identification information in the relay frame header segment does not represent the situation wherein the transferred communication information should be further transferred compulsorily nor the situation wherein the transferred communication information is able to be deleted, the temporary managing portion 16 is operative to read the identification information in each of the relay frame header segment and the frame header segment contained in the data frame of the framed data for storage from the temporary memory means 15 to be stored in main memory means 17. Therefore, the identification information provided in each of the relay frame header segment and the frame header segment shown in FIG. 3D is stored in the main memory means 17. The main memory means 17 stores therein the identification information provided in each of the relay frame header segment and the frame header segment under the control by a main managing portion 18 which is provided exclusively for the main memory means 17. The main managing portion 18 operates also under the control by the operation control portion 20.

The temporary managing portion 16 is further operative to provide the node header segment remaining in the temporary memory means 15 with identification information representing a state of waiting for a judgment by the main managing portion 18.

The main managing portion 18 is operative to cause the identification information in each of the relay frame header segment and the frame header segment stored in, the main memory means 17 to be preserved as arranged history information in a history information database area provided in the main memory means 17. Therefore, in the history information database area provided in the main memory means 17, a history information database wherein the identification information in each of the relay frame header segment and the frame header segment which had been stored in the main memory means 17 in the past has been preserved as the history information is constituted as a part of the database DB shown in FIG. 1.

The main managing portion 18 is further operative to compare the identification information in each of the relay frame header segment and the frame header segment stored newly in the main memory means 17 with the history information preserved in the history information database area provided in the main memory means 17 to have the result of the comparison. Then, the main managing portion 18 decides, on the basis of the result of the comparison, for example, whether a transmission source of the input information signal, from which the identification information in each of the relay frame header segment and the frame header segment is obtained, is a communication terminal belonging to the relay node constituted with the embodiment shown in FIG. 2 or not, whether a destination of the input information signal, from which the identification information in each of the relay frame header segment and the frame header segment is obtained, is a communication terminal belonging to the relay node constituted with the embodiment shown in FIG. 2 or not, whether the input information signal, from which the identification information in each of the relay frame header segment and the frame header segment is obtained, has arrived at the relay node constituted with the embodiment shown in FIG. 2 or not, and so on, to make judgments of the input information signal.

Further, the identification information in each of the relay frame header segment and the frame header segment stored in the main memory means 17 is subjected, as occasion demands, by the main managing portion 18, to modifying process by which the identification information in each of the relay frame header segment and the frame header segment is modified, as occasion demands, in response to the judgments of the input information signal, or added, as occasion demands, a flag responding to the judgments of the input information signal. The value represented by the Budget which is contained in the identification information in the relay frame header segment is reduced by, for example, 200 in the modifying process. Then, the identification information in each of the relay frame header segment and the frame header segment having been subjected, as occasion demands, to the modifying process, is discharged as processed identification information from the main memory means 17 to the temporary memory means 15 by the main managing portion 18.

That is, the main memory means 17 stores the identification information provided in the data frame of the framed data for storage stored in and then read from the temporary memory means 15 so as to preserve the same as the arranged history information in the history information database area and then discharges the identification information stored therein or the identification information having been subjected to the modifying process to the temporary memory means 15 as the processed identification information, under the control by the main managing portion 18. As a result, the processed identification information is transferred from the main memory means 17 to the temporary memory means 15.

When the processed identification information has been transferred from the main memory means 17 to the temporary memory means 15, the temporary managing portion 16 is operative to provide the relay frame header segment and the frame header segment provided in the framed data for storage stored in the temporary memory means 15, which has the node header segment wherein the identification information representing the state of waiting for the judgment by the main managing portion 18 is provided, with the processed identification information transferred thereto. Thereby, framed data for discharge which form a data frame containing the node header segment, the relay frame header segment and the frame header segment, in which the processed identification information is provided, and the information segment in which the communication information is provided, are produced. The temporary managing portion 16 is operative, as occasion demands, to put the framed data for discharge thus produced in a condition wherein the node header segment of the framed data for storage is deleted so that the framed data for discharge forms the data frame containing the relay frame header segment, the frame header segment and the information segment, and the framed data for discharge without the node header segment are discharged from the temporary memory means 15 to the reassembling and segmenting portion 14 to be subjected to transmitting process or deleted without being discharged to the reassembling and segmenting portion 14.

That is, the temporary memory means 15 stores temporarily the framed data for storage from the reassembling and segmenting portion 14 and further stores temporarily the framed data for discharge which form the data frame containing the relay frame header segment and the frame header segment, in which the processed identification information is provided, and the information segment in which the communication information is provided, and then, as occasion demands, discharges the framed data for discharge to the reassembling and segmenting portion 14 to be subjected to the transmitting process or deletes the framed data for discharge without discharging the same to the reassembling and segmenting portion 14 under the control by the temporary managing portion 16.

The reassembling and segmenting portion 14 is operative to cause the framed data for discharge from the temporary memory means 15 to be subjected to segmenting process for producing an output information signal based on the framed data for discharge and to supply one of the signal receiving and transmitting portions 12 and 13a to 13n with the output information signal in response to the processed identification information contained in the data frame of the framed data for discharge. The selected one of the signal receiving and transmitting portions 12 and 13a to 13n to which the output information signal is supplied is operative to produce an output communication signal based on the output information signal and then transmit the output communication signal to a communication terminal belonging to the relay node constituted with the embodiment shown in FIG. 2 or other relay nodes each contiguous to the relay node constituted with the embodiment shown in FIG. 2. Thereby, the transmission of the framed data for discharge is carried out.

As described above, in the relay node constituted with the embodiment shown in FIG. 2 to be provided for relaying the communication information, the operation control portion 20 which controls the temporary managing portion 16 and the main managing portion 18 causes the temporary managing portion 16 and the main managing portion 18 to carry out the below-mentioned operations, in addition to the control operations for storing temporarily the framed data for storage and the framed data for discharge in the temporary memory means 15 and the control operations for storing and preserving the identification information in the main memory means 17 and discharging the processed identification information from the main memory means 17. That is, the temporary managing portion 16 and the main managing portion 18 carry out the following operations under the control by the operation control portion 20.

The temporary managing portion 16 detects the amount of storage of the framed data for storage in the temporary memory means 15 at intervals of predetermined time by measuring the number of data frames (in case of fixed length data frames) or the amount of data (in case of variable length data frames) of the framed data for storage at intervals of the predetermined time and further detects the amount of discharge of the framed data for discharge from the temporary memory means 15 at intervals of predetermined time by measuring the number of data frames (in case of fixed length data frames) or the amount of data (in case of variable length data frames) of the framed data for discharge at intervals of the predetermined time. Then, the temporary managing portion 16 obtains storage amount data representing the result of the measurement of the number of data frames or the amount of data of the framed data for storage at intervals of the predetermined time and discharge amount data representing the result of the measurement of the number of data frames or the amount of data of the framed data for discharge at intervals of the predetermined time. The storage amount data and the discharge amount data thus obtained are stored in a storage/discharge amount data area provided in the temporary memory means 15 and then discharged from the temporary memory means 15 to the main memory means 17 to be reserved as state information in a state information database area provided in the main memory means 17 by the temporary managing portion 16 under the control by the operation control portion 20.

Although the storage/discharge amount data area is provided in the temporary memory means 15 in the embodiment shown in FIG. 2, it is also possible to eliminate the storage/discharge amount data area from the temporary memory means 15. In such a case, the storage amount data and the discharge amount data obtained by the temporary managing portion 16 are reserved as the state information directly in the state information database area provided in the main memory means 17 by the main managing portion 18.

The main managing portion 18 determines the amount of input communication signal reception (hereinafter, referred merely to the amount of reception) and the amount of output communication signal transmission (hereinafter, referred merely to the amount of transmission), in the form of a reception count value and a transmission count value each having a predetermined initial value and expected to be stored in the state information database area provided in the main memory means 17, on the basis of the storage amount data and the discharge amount data reserved in the state information database area provided in the main memory means 17.

In such a situation, the main managing portion 18 is operative to compare each successive two of the storage amount data obtained at intervals of the predetermined time with each other and to decrease the reception count value by 1 when the value represented by the antecedent storage amount data is larger than the value represented by the sequent storage amount data, increase the reception count value by 1 when the value represented by the antecedent storage amount data is smaller than the value represented by the sequent storage amount data and leave the reception count value as it is when the value represented by the antecedent storage amount data is equal to the value represented by the sequent storage amount data. As a result, the reception count values varying at successive intervals are obtained as the amount of reception. Similarly, the main managing portion 18 is operative to compare each successive two of the discharge amount data obtained at intervals of the predetermined time with each other and to decrease the transmission count value by 1 when the value represented by the antecedent transmission amount data is larger than the value represented by the sequent transmission amount data, increase the transmission count value by 1 when the value represented by the antecedent transmission amount data is smaller than the value represented by the sequent transmission amount data and leave the transmission count value as it is when the value represented by the antecedent transmission amount data is equal to the value represented by the sequent transmission amount data. As a result, the transmission count values varying at successive intervals are obtained as the amount of transmission.

The main managing portion 18 is further operative to compare the reception count value representing the amount of reception with the transmission count value representing the amount of transmission at intervals of predetermined time to obtain comparative result data representing the result of the comparison and to store the comparative result data in the state information database area provided in the main memory means 17. Then, the main managing portion 18 recognizes an excessive input communication signal reception state, an excessive output communication signal transmission state and a balanced input communication signal reception/output communication signal transmission state on the basis of the comparative result data at intervals of the predetermined time. Such recognition of states is carried out by perceiving the excessive input communication signal reception state when the comparative result data represent that the reception count value is larger that the transmission count value, perceiving the excessive output communication signal transmission state when the comparative result data represent that the reception count value is smaller that the transmission count value, and perceiving the balanced input communication signal reception/output communication signal transmission state when the comparative result data represent that the reception count value is equal to the transmission count value.

The main managing portion 18 puts the excessive input communication signal reception state, the excessive output communication signal transmission state and the balanced input communication signal reception/output communication signal transmission state thus recognized on record with a balanced state count value, an accumulated 1 count value, an accumulated 0 count value, an accumulated $-1$ count value and a synthetic accumulated value stored in a count value area provided in the main memory means 17. The balanced state count value is set at intervals of predetermined time to take 1 when the excessive input communication signal reception state is recognized, to take $-1$ when the excessive output communication signal transmission state is recognized and to take 0 when the balanced input communication signal reception/output communication signal transmission state is recognized. The accumulated 1 count value is set at intervals of the predetermined time to take a value obtained by accumulating the number of 1 which the balanced state count value takes. The accumulated 0 count value is set at intervals of the predetermined time to take a value obtained by accumulating the number of 0 which the balanced state count value takes. The accumulated $-1$ count value is set at intervals of the predetermined time to take a value obtained by accumulating the number of $-1$ which the balanced state count value takes. The synthetic accumulated value is set at intervals of the predetermined time to take a value represented by the expression: (1×the accumulated 1 count value)+($-1$×the accumulated $-1$ count value).

For example, when the sequence of the balanced state count values is 0, 1, 1, 0, $-1$, $-1$, 1, $-1$, 1, 1, 1, 1, 1, . . . , the sequence of the accumulated 1 count values, the sequence of the accumulated 0 count values, the sequence of the accumulated $-1$ count values and the sequence of the synthetic accumulated values are represented as follows: the sequence of the accumulated 1 count values: 0, 1, 2, 2, 2, 2, 3, 3, 4, 5, 6, 7, 8, . . . , the sequence of the accumulated 0 count values: 1, 1, 1, 2, 2, 2, 2, 2, 2, 2, 2, 2, 2 . . . , the sequence of the accumulated −1 count values: 0, 0, 0, 0, 1, 2, 2, 3, 3, 3, 3, 3, 3, . . . , and the sequence of the synthetic accumulated values: 0, 1, 2, 2, 1, 0, 1, 0, 1, 2, 3, 4, 5, . . . .

Each of the receiving count value and the transmission count value is provided with the maximum count value having a predetermined initial value. The main managing portion 18 is operative, at intervals of predetermined short time, to decrease by 1 one of the maximum count value of the receiving count value and the maximum count value of the transmission count value and to increase by 1 the other of the maximum count value of the receiving count value and the maximum count value of the transmission count value so that the sum of the maximum count value of the receiving count value and the maximum count value of the transmission count value is not changed when the excessive input communication signal reception state or the excessive output communication signal transmission state is recognized, and to leave each of the maximum count value of the receiving count value and the maximum count value of the transmission count value as it is when the balanced input communication signal reception/output communication signal transmission state is recognized. The variation in the maximum count value of the reception count value at intervals of the predetermined short time, such as 1, 0 or −1, and the variation in the maximum count value of the transmission count value at intervals of the predetermined short time, such as 1, 0 or −1 are also stored in the state information database area provided in the main memory means 17. These variations in the maximum count values can be used as useful indexes for the amount of reception and the amount of transmission.

A combination of the main managing portion 18 and the temporary managing portion 16 is operative to cause the temporary memory means 15 to keep always a certain amount of storage of the framed data for storage and a certain amount of discharge of the framed data for discharge. Therefore, when the storage amount data represent that the storage of the framed data for storage is not carried out actually in the temporary memory means 15, dummy data are stored in the temporary memory means 15 so that the reception count value corresponding to, for example, almost 80 percents of the maximum count value is obtained. Similarly, when the discharge amount data represent that the discharge of the framed data for discharge is not carried out actually in the temporary memory means 15, dummy data are discharged from the temporary memory means 15 so that the transmission count value corresponding to, for example, almost 80 percents of the maximum count value is obtained. In fact, the storage of the dummy data in the temporary memory means 15 and the discharge of the dummy data from the temporary memory means 15 thus carried out do not participate in increase or decrease in the reception count value, the transmission count value, the maximum count value of the reception count value or the maximum count value of the transmission count value.

The combination of the main managing portion 18 and the temporary managing portion 16 is further operative to cause the output communication signal based on the dummy date discharged from the temporary memory means 15 to be transmitted to other relay nodes each contiguous to the relay node constituted with the embodiment shown in FIG. 2 other than the communication terminal belonging to the relay node constituted with the embodiment shown in FIG. 2. Besides, the main managing portion 18 and the temporary managing portion 16 are operative to cause the storage of the dummy data in the temporary memory means 15 and the discharge of the dummy data from the temporary memory means 15 to be reduced gradually or become extinct at last in response to increase in the storage of the framed data for storage in the temporary memory means 15 and the discharge of the framed data for discharge from the temporary memory means 15.

The storage of the dummy data in the temporary memory means 15 and the discharge of the dummy data from the temporary memory means 15 thus carried out can be used for avoiding a sudden increase in the amount of storage of the framed data for storage in the temporary memory means 15 so as to have smooth variations in the amount of storage of the framed data for storage in the temporary memory means 15 and the amount of discharge of the framed data for discharge from the temporary memory means 15.

Under such a situation, the main managing portion 18 and the temporary managing portion 16 are operative to have the sum of the balanced state count values which are obtained in a period of the predetermined time to be stored in the count value area provided in the main memory means 17 in response to the excessive input communication signal reception state, the excessive output communication signal transmission state and the balanced input communication signal reception/output communication signal transmission state each recognized on the basis of the comparative result data stored in the state information database area provided in the main memory means 17, and to find an excessive input state when the sum of the balanced state count values obtained in the period of the predetermined time takes a positive value, an excessive output state when the sum of the balanced state count values obtained in the period of the predetermined time takes a negative value and a balanced input/output state when the sum of the balanced state count values obtained in the period of the predetermined time is zero. Then, the combination of the main managing portion 18 and the temporary managing portion 16 controls the storage of the framed data for storage or the dummy data in the temporary memory means 15 and the discharge of the framed data for discharge or the dummy data from the temporary memory means 15 in response to the excessive input state, the excessive output state or the balanced input/output state found in such a manner as mentioned above, so that the embodiment shown in FIG. 2 is put in a state transition from one of various states including a swaying stable state, a stable state with a large amount of communication, a stable state with a small amount of communication, temporary signal reception refusing state, a temporary signal transmission refusing state, a signal reception/transmission refusing state, and so on, as explained below, to the other of the various states.

In the swaying stable state, each of the reception count value and the transmission count value varies to increase or decrease within a predetermined range so that the balanced input/output state is maintained. In the stable state with a large amount of communication, the balanced input/output state in which each of the reception count value and the transmission count value is relatively large is maintained. In the stable state with a small amount of communication, the balanced input/output state in which each of the reception count value and the transmission count value is relatively small is maintained. In the temporary signal reception refusing state, the input communication signal is not able to be received temporarily. That is, the temporary signal reception refusing state is a quasi-obstructive state wherein a temporary obstruction has occurred and the input communication signal is relayed through one or more relay nodes other than the relay node constituted with the embodiment shown in FIG. 2. In the temporary signal transmission refusing state, the output communication signal is not able to be transmitted temporarily. That is, the temporary signal transmission refusing state is a quasi-obstructive state wherein a temporary obstruction has occurred. In the signal reception/transmission refusing state, a communication obstruction arises so that the reception of the input communication signal and the transmission of the output communication signal are not able to be conducted, and dummy data are produced.

The combination of the main managing portion 18 and the temporary managing portion 16, which brings about the above-mentioned state transition, is operative to forecast the progress of the excessive input communication signal reception state or the progress of the excessive output communication signal transmission state and further brings about a situation wherein the reception of the input communication signal or the transmission of the output communication signal is restrained in response to the result of the forecast. Then, in the case where a plurality of relay nodes, each of which is constituted with the embodiment in FIG. 2 having the main managing portion 18 and the temporary managing portion 16, are dispersedly arranged in such a manner that each contiguous two of the relay nodes are placed with their communication areas overlapping partially with each other, a novel communication network, such as the communication network including the relay nodes 11a to 11i as shown in FIG. 1, is constituted. In such a communication network, each of the relay nodes is operative to make a forecast and a judgment of the amount of communication traffic flowing through the relay nodes and to control the communication traffic flowing through the relay nodes in response to the result of the forecast and the result of the judgment. Consequently, the communication traffic is dispersed over the whole communication network so that problems brought about by one or more bottlenecks formed in the communication network, which result from the convergence of the communication traffic induced in one or more relay nodes in the communication network, can be avoided surely and effectively.

In the communication network constituted with the relay nodes, each of which is constituted with the embodiment in FIG. 2 having the main managing portion 18 and the temporary managing portion 16 and which are dispersedly arranged in such a manner that each contiguous two of the relay nodes are placed with their communication areas overlapping partially with each other, the main managing portion 18 and the temporary managing portion 16 in the embodiment in FIG. 2 constituting the relay node are operative to fulfill the following functions, in addition to the functions described above, under the control by the operation control portion 20.

First, the main managing portion 18 in one of the relay nodes each constituted with the embodiment in FIG. 2 (hereinafter, referred to as a subject relay node) detects the number of the relay nodes each contiguous to the subject relay node on the basis of the history information stored in the history information database area provided in the main memory means 17 or the state information stored in the state information database area provided in the main memory means 17. The number of the relay nodes each contiguous to the subject relay node is referred to as the number NB, hereinafter.

The detection of the number NB conducted based on the history information by the main managing portion 18 is carried out in such a manner as described below.

Each of the relay nodes is operative to transmit, through one of the signal receiving and transmitting portions 13a to 13n, the output communication signal obtained based on the framed date for discharge which forms the data frame containing the relay frame header segment wherein identification information (ID) inherent in the relay node in question is provided. (The output communication signal thus transmitted is referred to as a HELO signal, hereinafter.) Each of the relay nodes is further operative to receive, as the input communication signal, through one of the signal receiving and transmitting portions 13a to 13n, the HELO signal transmitted by one of other relay nodes and then to transmit, as the output communication signal, through one of the signal receiving and transmitting portions 13a to 13n, the received HELO signal to be transferred.

Accordingly, this means that, when one of the relay nodes transmits its own HELO signal, the other of the relay nodes receives and then transfers the HELO signal so as to be received by the relay node which has transmitted its own HELO signal as the transferred its own HELO signal. The relay node which has received the transferred its own HELO signal from the other of the relay nodes is operative to preserve a record of the reception of the transferred its own HELO signal from the other of the relay nodes as the history information stored in the history information database area provided in the main memory means 17, to judge whether the transferred its own HELO signal has come directly from the other of the relay nodes or not on the basis of the value represented by the Budget which is provided in the relay frame header segment in the framed data for storage obtained from the transferred its own HELO signal, to regard the transferred its own HELO signal which has come directly from the other of the relay nodes as the transferred its own HELO signal from the relay node contiguous thereto, and to preserve a record of the reception of the transferred its own HELO signal from the relay node contiguous thereto as the history information stored in the history information database area provided in the main memory means 17.

Under such a situation, the main managing portion 18 in the subject relay node detects the number NB on the basis of the record of the reception of the transferred its own HELO signal from the relay node contiguous to the subject relay node, which is preserved as the history information stored in the history information database area provided in the main memory means 17.

The detection of the number NB conducted based on the state information by the main managing portion 18 is carried out in such a manner as described below.

Each of the relay nodes is operative to transmit its own HELO signal through one of the signal receiving and transmitting portions 13a to 13n and receive the transferred its own HELO signal from the other of the relay nodes through one of the signal receiving and transmitting portions 13a to 13n in such a manner as described above. Then, each of the relay nodes is further operative to preserve a record of the reception of the transferred its own HELO signal from the other of the relay nodes as the history information stored in the history information database area provided in the main memory means 17 and also to preserve the number of times of the reception of the transferred its own HELO signal from the other of the relay nodes as the state information stored in the state information database area provided in the main memory means 17.

In each of the relay nodes, which receives the transferred its own HELO signal from the other of the relay nodes, the number of times of the reception of the transferred its own HELO signal from the relay node which is contiguous thereto becomes larger than the number of times of the reception of the transferred its own HELO signal from the relay node which is not contiguous thereto.

Under such a situation, the main managing portion 18 in the subject relay node is operative to find the relay node in which the number of times of the transferred its own HELO signal in a predetermined period of time becomes equal to or larger than a predetermined number of times on the basis of the number of times of the reception of the transferred its own HELO signal from the other of the relay nodes, which is preserved as the state information stored in the state information database area provided in the main memory means 17, and then to detect the number NB by means of counting the relay nodes thus found as the relay nodes each contiguous to the subject relay node.

The main managing portion 18 causes the number NB thus detected to be preserved as the state information in the state information database area provided in the main memory means 17.

In addition to the detection of the number NB, the main managing portion 18 is further operative to produce pseudo-random numbers N-ran by using the balanced state count values stored in the count value area provided in the main memory means 17 as seeds of random numbers. In the production of the pseudo-random numbers N-ran, a random numbers count value which takes 1 when the balanced state count value, which takes three values, that is, −1, 0 and 1, turns at intervals of counter clocks to 0 from −1, to 0 from 0 just after having turned to 0 from −1 and in sequence thereafter, to 1 from 0, and to 1 from 1 just after having turned to 1 from 0 and in sequence thereafter, and takes 0 when the balanced state count value turns at intervals of the counter clocks to 0 from 1, to 0 from 0 just after having turned to 0 from 1 and in sequence thereafter, to −1 from 0, and to −1 from −1 just after having turned to −1 from 0 and in sequence thereafter, is obtained, and the random numbers count value thus obtained to take 1 or 0 is set to be the pseudo-random numbers N-ran.

The production of the pseudo-random numbers N-ran is carried out continuously in response to the balanced state count value obtained at intervals of the counter clocks and the main managing portion 18 is operative to cause the pseudo-random numbers N-ran thus produced to be stored in a random numbers area provided in the main memory means 17 as data overwritten successively.

Then, the main managing portion 18 is operative to obtain probability of deletion: P-drop or probability of transmission: P-send with regard to the data frame of the framed data for discharge and probability of delay: P-delay with regard to the data frame of the framed data for discharge on the occasion of the transmission of the framed data for discharge, on the basis of the storage amount data and the discharge amount data, which are preserved as the state information in the state information database area provided in the main memory means 17 by the temporary managing portion 16 when the data frame of the framed data forming the data frame containing the node header segment, the relay frame header segment and the frame header segment wherein the processed identification information is provided and the information segment wherein the communication information is provided, is obtained, and the number NB.

The probability of deletion: P-drop or the probability of transmission: P-send with regard to the data frame of the framed data for discharge and the probability of delay: P-delay with regard to the data frame of the framed data for discharge are obtained in such a manner as described below, for example.

First, in the subject relay node, the reception amount Tin(tn) (n=0, 1, 2, 3, . . . , tn represents each of successive time points in a predetermined short period of time.) of the input communication signal from the relay nodes other than the subject relay node is detected, as state information, based on the storage amount data preserved in the state information database area provided in the main memory means 17 at intervals of the predetermined short period of time, and the reception amount Tin(tn)/NB is obtained by dividing the reception amount Tin(tn) by the number NB preserved as the state information in the state information database area provided in the main memory means 17. Similarly, in the subject relay node, the maximum transmission amount Tmax(tn) (Tmax(tn) takes a positive value.) of the output communication signal to the relay nodes other than the subject relay node is detected, as state information, based on the discharge amount data preserved in the state information database area provided in the main memory means 17 at intervals of the predetermined short period of time, and a relation represented by the expression: $0 \leq Tin(tn)/NB \leq Tmax(tn)$ is established.

Then, a relation represented by the expression: $0 \leq Tin(tn)/NB \cdot Tmax(tn) \leq 1$ is obtained by dividing $0 \leq Tin(tn)/NB \leq Tmax(tn)$ by Tmax(tn). The expression: $P(tn)=Tin(tn)/NB \cdot Tmax(tn)$ is established so that P(tn) is treated as probability.

A couple of functions: fA(NB) and fB(NB) relative to the number NB are established in such a manner that, for example, $fA(NB)=e^{-NB}$ and $fB(NB)=1/NB$, and the probability P(tn) is provided with an initial value (a value at the time point t0) P(t0) which is represented by the expression: P(t0)=Ave[fA(NB)+fB(NB)]. Ave[fA(NB)+fB(NB)] represents the average of fA(NB) and fB(NB).

Then, the probability P(t1) at the time point P1, the probability P(t2) at the time point P2, the probability P(t3) at the time point P3, . . . , the probability P(tm) at the time point tm, . . . , are obtained in such a manner that P(t1)=Ave[fA(NB)+fB(NB)+P(t0)] (Ave [fA(NB)+fB(NB)+P(t0)] represents the average of fA(NB), fB(NB) and P(t0) in the same manner as the followings), P(t2)=Ave[fA(NB)+fB(NB)+P(t1)], P(t3)=Ave[fA(NB)+fB(NB)+P(t2)], . . . , P(tm)=Ave[fA(NB)+fB(NB)+P(t(m−1))], The probabilities P(t0), P(t1), P(t2), P(t3), . . . , P(tm), . . . , are preserved in sequence as probability information in a probability information area provided in the main memory means 17.

At the time point t0, in the subject relay node, an electric power source for operation has been already turned on and any information communication signal from the relay nodes other than the subject relay node has not been received yet. Supposing that the probability of deletion or the provability of transmission is required at a time point tx in order to make such a judgment of deleting or transmission as described later with regard to the data frame of the framed data for discharge and the probability of delay is required at a time point ty in order to make such an arrangement for transmission as described later with regard to the data frame of the framed data for discharge, the probability P(tx) corresponding to the time point tx is picked up from the probability information area provided in the main memory means 17 wherein the probabilities P(t0), P(t1), P(t2), P(t3), . . . , P(tm), . . . , are preserved, so as to be the probability of deletion: P-drop or used for producing a probability 1-P(tx) which is treated as the probability of transmission P-send and the probability P(ty) corresponding to the time point ty is picked up from the probability information area provided in the main memory means 17 so as to be the probability of delay: P-delay.

In the manner described above, the probability of deletion P-drop is obtained with the probability P(tx) or the probability of transmission: P-send is obtained with the probability 1-P(tx), and the probability of delay: P-delay is obtained with the probability P(ty). The probability of deletion: P-drop or the probability of transmission P-send and the probability of delay: P-delay thus obtained by the main managing portion 18 are supplied, as occasion demands, to the temporary managing portion 16.

In a situation wherein the probability of deletion: P-drop or the probability of transmission: P-send and the probability of delay: P-delay thus obtained by the main managing portion 18 are obtained as described above, the temporary managing portion 16 is operative to carry out deletion control or transmission control with regard to the data frame of the framed data for discharging in the temporary memory means 15 in response to the probability of deletion: P-drop or the probability of transmission P-send and the probability of delay: P-delay supplied from the main managing portion 18 and the pseudo-random numbers N-ran read from the random numbers area provided in the main memory means 17 by the main managing portion 18.

In the deletion control or the transmission control carried out by the temporary managing portion 16, first, the judgment of deletion or transmission with regard to the data frame of the framed data for discharge is made on the basis of the probability of deletion: P-drop or the probability of transmission P-send and the pseudo-random numbers N-ran. In the judgment of deletion or transmission, the data frame of the framed data for discharging is judged to be positively transmitted when the probability of deletion: P-drop is 0% or the probability of transmission: P-send is 100% and to be positively deleted when the probability of deletion: P-drop is 100% or the probability of transmission: P-send is 0%.

When the probability of deletion: P-drop or the probability of transmission: P-send is more than 0% and less than 100%, the random numbers count values each taking 1 or 0 so as to form the pseudo-random numbers N-ran are picked up in a picking-up time which is set to correspond to the probability of deletion: P-drop or the probability of transmission: P-send. The longer the picking-up time is the more the probability of deletion: P-drop or the probability of transmission: P-send is. Then, a ratio $\alpha$ of the number X of the random numbers count values each taking 1 contained in the random numbers count values picked up in the picking-up time to the total number Z of the random numbers count values picked up in the picking-up time, that is, $\alpha=(X/Z)\times 100\%$ is calculated.

In the case where the ratio $\alpha$ is obtained under a condition wherein the random numbers count values are picked up in the picking-up time set to correspond to the probability of deletion: P-drop, the data frame of the framed data for discharging is judged to be deleted when the ratio $\alpha$ is equal to or more than 50% and to be transmitted when the ratio $\alpha$ is less than 50%. Further, in the case where the ratio $\alpha$ is obtained under a condition wherein the random numbers count values are picked up in the picking-up time set to correspond to the probability of transmission: P-send, the data frame of the framed data for discharging is judged to be transmitted when the ratio $\alpha$ is equal to or more than 50% and to be deleted when the ratio $\alpha$ is less than 50%.

If identification information corresponding to the destination of the data frame of the framed data for discharge is preserved in the history information database area provided in the main memory means 17, it is possible to cause the probability of deletion: P-drop or the probability of transmission: P-send to be subjected to a process for reducing the probability of deletion: P-drop or increasing the probability of transmission: P-send in such a manner that, for example, the probability P(tx) forming the probability of deletion: P-drop is reduced to be probability P(tx)/2 or the probability 1-P(tx) forming the probability of transmission: P-send is increased to be probability 1-P(tx)/2. In such a case, the directivity of the output communication signal transmitted from the subject relay node toward the destination is increased so that undesirable electric wave collision is avoided more effectively.

When the data frame of the framed data for discharge is judged to be transmitted as a result of the judgment of deletion or transmission, the probability of delay: P-delay is used for the arrangement for transmission with regard to the data frame of the framed data for discharge. In the arrangement for transmission, a transmission delay time required for transmitting the data frame of the framed data for discharge is set in response to the probability of delay: P-delay in such a manner that the transmission delay time is set to be the predetermined shortest delay time (including zero) when the probability of delay: P-delay is 0%, to be the predetermined longest delay time when the probability of delay: P-delay is 1000%, to be a predetermined delay time longer than the predetermined shortest delay time and shorter than the predetermined longest delay time when the probability of delay P-delay is more than 0% and less than 100%.

The data frame of the framed data for discharge which has been judged to be deleted as a result of the judgment of deletion or transmission is added to the node header segment a deleting flag constituted with identification information representing that the data frame is to be deleted or a judgment flag constituted with identification information representing that the judgment of deletion or transmission has been done and then subjected to a deletion process by the temporary managing portion 16.

On the other hand, the data frame of the framed data for discharge which has been judged to be transmitted as a result of the judgment of deletion or transmission is delayed by the transmission delay time set in the arrangement for transmission and then subjected to a discharge process by the temporary managing portion 16. In the discharge process, the node header segment contained in the data frame of the framed data for discharge is deleted so that the data frame of the framed data for discharge is reconstructed to contain the relay frame header segment, the frame header segment and the information segment, and the data frame of the framed data for discharge thus reconstructed is discharged from the temporary memory means 15 to the reassembling and segmenting portion 14 to be subjected to a transmission process. In the transmission process, the output communication signal produced based on the framed data for discharge is transmitted through one of the signal receiving and transmitting portions 13a to 13n. Thereby, the transmission of the data frame of the framed data for discharge is carried out.

Figure 4:
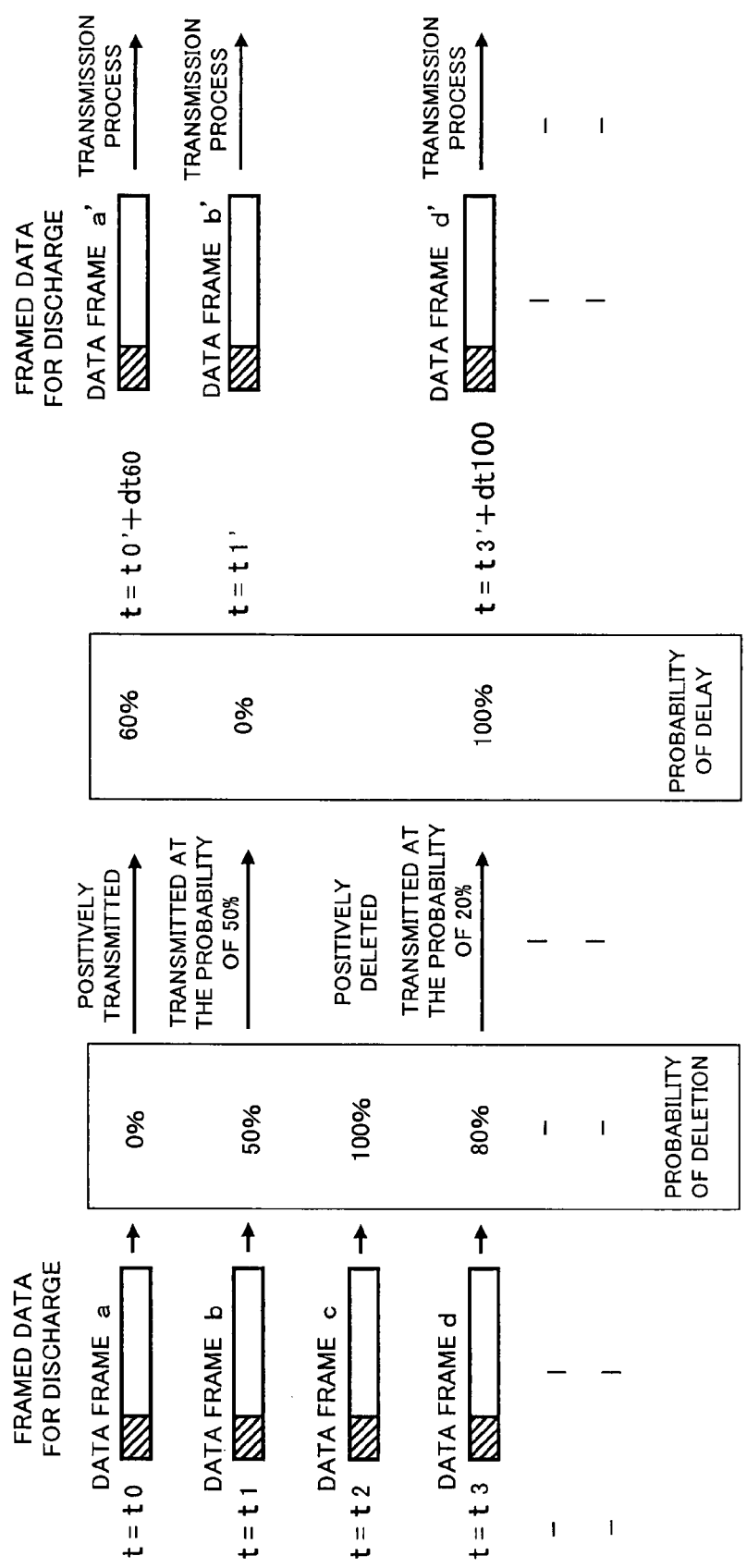
FIG. 4 is a schematic illustration used for explaining a judgment of deletion and a determination of delay time in the embodiment shown in FIG. 2.

The deletion control or the transmission control by the temporary managing portion 16 to the data frame of the framed data for discharge obtained in the temporary memory means 15 is put in practice, for example, in such a manner as shown in FIG. 4.

In the example shown in FIG. 4, supposing that a data frame a of framed data for discharge is obtained in the temporary memory means 15 at a time point t=t0 and the probability of deletion: P-drop with regard to the data frame a is 0%, the data frame a is judged to be positively transmitted in the deletion judgment. Then, supposing that the probability of delay: P-delay with regard to the data frame a having judged to be positively transmitted is 60%, a transmission delay time dt60 corresponding to the probability of delay: P-delay of 60% is set in the arrangement for transmission with regard to the data frame a. Therefore, the data frame a is delayed by the transmission delay time dt60 to become a data frame a' and the data frame a' is subjected positively to the transmission process at a time point t=t0'+dt60 (t0' represents a time point delayed slightly compared with the time point t0).

Next, supposing that a data frame b of framed data for discharge is obtained in the temporary memory means 15 at a time point t=t1 and the probability of deletion: P-drop with regard to the data frame b is 50%, the data frame b is judged to be deleted at the probability of 50%, in other words, to be transmitted at the probability of 50%, in the deletion judgment. Then, supposing that the probability of delay: P-delay with regard to the data frame b having judged to be transmitted at the probability of 50% is 0%, the shortest transmission delay time corresponding to the probability of delay: P-delay of 0%, for example, a transmission delay time of zero, is set in the arrangement for transmission with regard to the data frame b. Therefore, the data frame b is delayed by the shortest transmission delay time to become a data frame b' or becomes a data frame b' without substantial delay and the data frame b' is subjected to the transmission process at the probability of 50% at a time point t=t1' (t1' represents a time point delayed slightly compared with the time point t1).

Then, supposing that a data frame c of framed data for discharge is obtained in the temporary memory means 15 at a time point t=t2 and the probability of deletion: P-drop with regard to the data frame c is 100%, the data frame c is judged to be positively deleted in the deletion judgment. Consequently, any transmission delay time is not set with regard to the data frame c and the data frame c is subjected to the deletion process.

Further, supposing that a data frame d of framed data for discharge is obtained in the temporary memory means 15 at a time point t=t3 and the probability of deletion: P-drop with regard to the data frame d is 80%, the data frame d is judged to be deleted at the probability of 80%, in other words, to be transmitted at the probability of 20%, in the deletion judgment. Then, supposing that the probability of delay: P-delay with regard to the data frame d having judged to be transmitted at the probability of 20% is 100%, the longest transmission delay time dt100 corresponding to the probability of delay: P-delay of 100% is set in the arrangement for transmission with regard to the data frame d. Therefore, the data frame d is delayed by the longest transmission delay time dt100 to become a data frame d' and the data frame d' is subjected to the transmission process at the probability of 200% at a time point t=t3'+dt100 (t3' represents a time point delayed slightly compared with the time point t3).

As described above, in the relay node constituted with the embodiment shown in FIG. 2, the operation control portion 20 is operative to cause the temporary managing portion 16 and the main managing portion 18 to utilize the state information preserved in the state information database area provided in the main memory means 17 or the history information preserved in the history information database area provided in the main memory means 17 and the state information preserved in the state information database area provided in the main memory means 17 for obtaining the probability of deletion or transmission and the probability of delay with regard to the data frame of the framed data for discharge and to control, on the basis of the obtained probability of deletion or transmission and the obtained probability of delay, the deletion or the transmission of the data frame of the framed data for discharge and the delay for transmission of the data frame of the framed data for discharge on the occasion of the transmission thereof.

In the communication network constituted with a plurality of relay nodes, each of which is constituted with the embodiment in FIG. 2 and which are dispersedly arranged in such a manner that each contiguous two of the relay nodes are placed with their communication areas overlapping partially with each other, when the framed data for storage are obtained based on the received input communication signal and the framed data for discharge are produced on the basis of the framed data for storage in each of the relay nodes, the state information or the history and state information is utilized for obtaining the probability of deletion or transmission with regard to each date frame of the framed data for discharge and the probability of delay with regard to each date frame of the framed data for discharge and the date frame of the framed data for discharge is deleted or transmitted in accordance with the obtained probability of deletion or transmission and the obtained probability of delay so as to respond to the amount of reception and the amount of transmission. Consequently, with the relay node constituted with the embodiment in FIG. 2, the output communication signal is transmitted through the signal receiving and transmitting portion in such a manner as to be able to avoid electric wave collision arising on a communication channel selected to transmit the output communication signal without carrying out a so-called carrier sense accompanying with the CSMA/CA system or carrying out operations for transmitting and receiving control information, such as operations for transmitting and receiving the RTS information and the CTS information or operations for transmitting and receiving the CTS information accompanying with the MARCH system.

Accordingly, the embodiment shown in FIG. 2 can be applied to constitute each of relay nodes provided for constituting a novel wireless communication network, with which advantages exceeding the advantages obtained with the known wireless mesh network are obtained, and which avoids surely and effectively electric wave collision arising on a communication channel selected to transmit a communication signal in the wireless communication network without carrying out, for example, the carrier sense accompanying with the CSMA/CA system or carrying out operations for transmitting and receiving control information, for example, operations for transmitting and receiving the RTS information and the CTS information or operations for transmitting and receiving the CTS information accompanying with the MARCH system.

Figure 5:
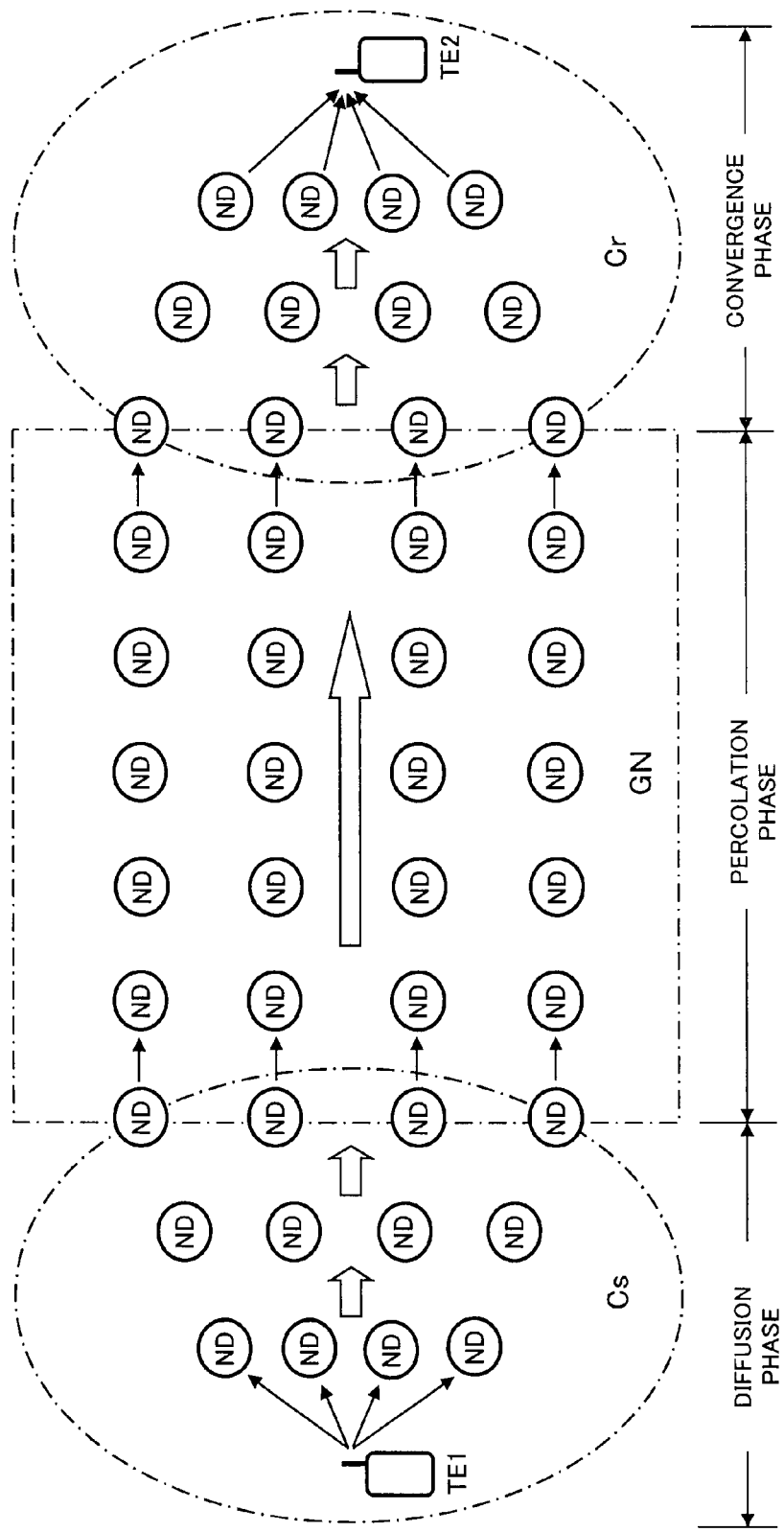
FIG. 5 is a schematic illustration used for explaining a communication signal transmitted from a transmission source to be relayed to a destination through a communication network constituted with a plurality of relay nodes, each of which can be constituted with the embodiment shown in FIG. 2.

FIG. 5 shows schematically and conceptually an operation state wherein a communication signal is transmitted from a transmission source to be relayed to a destination through a communication network constituted with a plurality of relay nodes, each of which is constituted with, for example, the embodiment shown in FIG. 2.

In FIG. 5, a communication terminal TE1 is the transmission source and another communication terminal TE2 is the destination so that the communication signal is transmitted from the communication terminal TE1 to be relayed to the communication terminal TE2. A plurality of circles, each of which surrounds "ND", represent the relay nodes dispersedly arranged in such a manner that each contiguous two of the relay nodes are placed with their communication areas overlapping partially with each other.

Each of the communication terminal TE1 and the relay nodes placed substantially in the vicinity of the communication terminal TE1 belongs to the same node group. Such a node group is referred to as a cloud, hereinafter. The node group to which each of the communication terminal TE1 and the relay nodes placed substantially in the vicinity of the communication terminal TE1 belongs is a cloud Cs. The relay nodes belonging to the cloud Cs take recognition of their existence with one another and are operative to relay in sequence the communication signal from the communication terminal TE1 to be diffused in the cloud Cs. In such relay of the communication signal, the Budget provided in a relay header segment of framed data corresponding to the communication signal from the communication terminal TE1 is provided with an initial value of, for example, 1000 and the value represented by the Budget reduces, for example, by 200 at every transit of the communication signal through the relay node.

At an outer edge portion of the cloud Cs, the relay nodes, each of which is operative to transmit the communication signal obtained based on the framed data having the relay header segment in which the Budget representing the value of, for example, 0 is provided, are positioned. Each of the relay nodes positioned at the outer edge portion of the cloud Cs serves the outside of the cloud Cs as a quasi-transmission source of the communication signal. Such a communication state in the cloud Cs is called a state of diffusion phase.

Each of the relay nodes positioned at the outer edge portion of the cloud Cs, which serves as the quasi-transmission source of the communication signal, belongs also to a relay node group GN subsequent to the cloud Cs and is operative to relay the communication signal from the communication terminal TE1 to other relay nodes belonging to the relay node group GN. The relay node group GN is expansive to reach a cloud Cr to which each of the communication terminal TE2 which is the destination and the relay nodes placed substantially in the vicinity of the communication terminal TE2 belongs. Each of the relay nodes positioned at an outer edge portion of the cloud Cr, which belongs to both of the cloud Cr and the relay node group GN, serves as a quasi-destination of the communication signal.

In the relay node group GN, each of the relay nodes is operative or not operative to relay the communication signal from the communication terminal TE1 in accordance with a predetermined probability so that the communication signal from the communication terminal TE1 is relayed from the relay nodes each serving as the quasi-transmission source of the communication signal to the relay nodes each serving as the quasi-destination of the communication signal to be percolated into the relay node group GN in response to the predetermined probability. The predetermined probability with regard to such percolation of the communication signal is so determined as to increase probability of arrival of the communication signal from the communication terminal TE1 at the quasi-destination. Such a communication state in the relay node group GN is called a state of percolation phase.

Each of the relay nodes serving as the quasi-destination at the outer edge portion of the cloud Cr, which belongs to both of the cloud Cr and the relay node group GN, is operative to relay the communication signal from the communication terminal TE1 to other relay nodes belonging to the cloud Cr. The relay nodes belonging to the cloud Cr take recognition of their existence with one another and are operative to relay in sequence the communication signal from the communication terminal TE1 to be converged at the communication terminal TE2 which is the destination. Such a communication state in the cloud Cr is called a state of convergence phase.

In such a manner as described above, in the example shown in FIG. 5, the communication signal from the communication terminal TE1 which is the transmission source is transmitted through the state of diffusion phase in the cloud Cs, the state of percolation phase in the relay node group GN and the state of convergence phase in the cloud Cr to the communication terminal TE2 which is the destination. Consequently, when the communication signal is transmitted from the transmission source through a relatively long communication channel to the destination, electric wave collision arising on the communication channel can be voided surely and effectively so that probability of arrival of the communication signal at the destination is increased.

APPLICABILITY FOR INDUSTRIAL USE

As apparent from the above description, the communication apparatus can be broadly applied to constitute each of relay nodes provided to constitute a novel communication network, with which advantages exceeding the advantages obtained with the known mesh network are obtained, and which avoids surely and effectively electric wave collision arising on a communication channel selected to transmit a communication signal in the communication network without carrying out the carrier sense or operations for transmitting and receiving control information, such as operations for transmitting and receiving the RTS information and the CTS information or operations for transmitting and receiving the CTS information.

The invention claimed is:
1. A communication apparatus comprising:
a signal receiving and transmitting portion operative to receive an input communication signal for obtaining an input information signal and to transmit an output communication signal based on an output information signal;
a reassembling and segmenting portion operative to cause the input information signal to be subjected to reassembling process for obtaining first framed data which form a data frame containing a header segment wherein identification information is provided and an information segment wherein communication information is provided and to cause second framed data which form a data frame containing a header segment wherein processed identification information is provided and an information segment wherein communication information is provided to be subjected to segmenting process for obtaining the output information signal;
temporary memory means for storing temporarily the first framed data obtained from the reassembling and segmenting portion and for storing temporarily the second framed data and then discharging the second framed data stored therein to the reassembling and segmenting portion;
main memory means for storing therein the identification information contained in the first framed data stored in the temporary memory means, preserving the stored identification information as history information, discharging the stored identification information or the stored identification information having been subjected to modifying process to the temporary memory means as the processed identification information, and preserving state information representing an excessive reception state of the input communication signal, an excessive transmission state of the output communication signal or a balanced reception/transmission state of the input and output communication signals, which is recognized based on information representing the amount of input communication signal reception and the amount of output communication signal transmission on the basis of the amount of first framed data storage at intervals of predetermined time and the amount of second framed data discharge at intervals of predetermined time and a result of comparison between the amount of input communication signal reception and the amount of output communication signal transmission;

a temporary managing portion operative to control operations in the temporary memory means for storing temporarily therein the first and second framed data;

a main managing portion operative to control operations in the main memory means for storing and preserving the identification information, discharging the processed identification information and preserving the state information; and an operation control portion operative to cause the temporary managing portion and the main managing portion to utilize the state information or the history and state information for obtaining probability of deletion or transmission and probability of delay with regard to the data frame of the second framed data and to control, on the basis of the obtained probability of deletion or transmission and the obtained probability of delay, deletion or transmission of the data frame of the second framed data and delay for transmission of the data frame of the second framed data on the occasion of the transmission thereof.

2. A communication apparatus according to claim 1, wherein said main managing portion is operative to obtain said result of comparison between the amount of input communication signal reception and the amount of output communication signal transmission by comparing a reception count value representing the amount of input communication signal reception at intervals of the predetermined time with a transmission count value representing the amount of output communication signal transmission at intervals of the predetermined time, and to cause a part of the state information to represent an excessive input communication signal reception state when said result of comparison represents that the reception count value is larger that the transmission count value, an excessive output communication signal transmission state when said result of comparison represents that the reception count value is smaller that the transmission count value and a balanced input communication signal reception/output communication signal transmission state when said result of comparison represents that the reception count value is equal to the transmission count value.

3. A communication apparatus according to claim 1, wherein said temporary managing portion and said main managing portion are operative to utilize the probability of deletion or transmission and pseudo-random numbers for controlling the deletion or the transmission of the data frame of the second framed data.

4. A communication apparatus according to claim 3, wherein said pseudo-random numbers are constituted with a sequence of numerals consisting of 0 and 1, and said temporary managing portion and said main managing portion are operative to pick up a number of 0 and 1 from the sequence of numerals constituting said pseudo-random numbers in a period of time corresponding to the probability of deletion or transmission, to obtain a ratio of the number of 0 or 1 to the total number of 0 and 1 picked up in said period of time, and to judge the data frame of the second framed data to be deleted or transmitted on the basis of said ratio.

5. A communication apparatus according to claim 3, wherein a part of the state information preserved in said main memory means forms data taking three values and said main managing portion is operative to cause said pseudo-random numbers to be obtained in the form of data taking two values based on said part of the state information.

* * * * *